US007783962B2

(12) United States Patent
Kwon et al.

(10) Patent No.: US 7,783,962 B2
(45) Date of Patent: Aug. 24, 2010

(54) ITERATIVE DECODING RECEIVER REDUCING COMPLEXITY OF PARTIAL SPHERE DECODING IN SPATIAL MULTIPLEXING SYSTEM AND METHOD THEREOF

(75) Inventors: Dong-Seung Kwon, Daejeon (KR); Chung-Gu Kang, Seoul (KR); Hyung-Ho Park, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1113 days.

(21) Appl. No.: 11/447,132

(22) Filed: Jun. 6, 2006

(65) Prior Publication Data

US 2007/0136648 A1 Jun. 14, 2007

(30) Foreign Application Priority Data

Dec. 12, 2005 (KR) .................. 10-2005-0121839

(51) Int. Cl.
*H03M 13/03* (2006.01)
(52) U.S. Cl. ...................... 714/794; 375/341
(58) Field of Classification Search ............ 714/794; 375/341
See application file for complete search history.

(56) References Cited

U.S. PATENT DOCUMENTS

| 5,510,604 | A * | 4/1996 | England | 235/462.25 |
| 7,526,037 | B2 * | 4/2009 | Hoo | 375/267 |
| 2002/0186800 | A1 * | 12/2002 | Berthet et al. | 375/347 |

OTHER PUBLICATIONS

Hyung Ho Park; "Complexity-Reduced Iterative MAP Receiver with Partial Sphere Decoding in MIMO System"; Autumn Conferences of Korea Institute of Communication Sciences; Nov. 19, 2005.
H. Vikalo, et al.; "Iterative decoding for MIMO channels via modified sphere decoding"; IEEE Transactions on Wireless Communications, vol. 3, No. 6, Nov. 2004.
E. Viterbo, et al.; "A universal lattice code decoder for fading channels"; IEEE Trans. Inform. Theory, vol. 4 5, pp. 1639-1642, Jul. 1997.
Jinho Choi.; "On the Partial MAP detection with Applications to MIMO Channels," in IEEE Transaction on signal processing, vol. 53, No. 1, Jan. 2005.

* cited by examiner

*Primary Examiner*—M. Mujtaba K Chaudry
*Assistant Examiner*—Enam Ahmed
(74) *Attorney, Agent, or Firm*—Lowe Hauptman Ham & Berner LLP

(57) ABSTRACT

The present invention relates to an iterative decoding receiver for reducing complexity of a partial sphere decoding operation in a spatial multiplexing system, and a method thereof. In the present invention, an iterative detection and decoding (IDD) method using a cost function-based iterative partial sphere decoding method and a soft cancellation-based iterative partial sphere decoding method is used to correct an initial estimation error. In a channel encoding spatial multiplexing system, since the iterative decoding receiver using decoding algorithms including a BCJR algorithm, an MPA, and a VA performs an SISO sphere decoding operation providing an optimum detection solution, the iterative decoding receiver may detect transmission symbols at a whole dimension by detecting the transmission symbols at a partial dimension, and therefore the complexity of the SISO sphere decoding operation may be greatly reduced.

15 Claims, 8 Drawing Sheets

ITERATIVE DECODING RECEIVER REDUCING COMPLEXITY OF PARTIAL SPHERE DECODING IN SPATIAL MULTIPLEXING SYSTEM AND METHOD THEREOF

CROSS-REFERENCE TO RELATED APPLICATION

This application claims priority to and the benefit of Korean Patent Application No. 10-2005-0121839 filed in the Korean Intellectual Property Office on Dec. 12, 2005, the entire contents of which are incorporated herein by reference.

BACKGROUND OF THE INVENTION (a) Field of the Invention

The present invention relates to an iterative decoding receiver in a spatial multiplexing system and a method thereof. More particularly, the present invention relates to an iterative decoding receiver for reducing complexity of a partial sphere decoding operation in a spatial multiplexing system, and reducing complexity of a soft input soft output (SISO) sphere decoding operation in the iterative decoding receiver using Bahl-Cocke-Jelinek-Raviv (BCJR), message passing algorithm (MPA), and Viterbi algorithm (VA) decoding algorithms in a channel encoding multiple antenna system, and a method thereof.

(b) Description of the Related Art

It is required to detect a maximum likelihood (ML) to obtain a maximized performance in a coded multiple input multiple output (MIMO) system. However, as the number of antennas is increased, complexity of an optimum receiving method by detecting the ML is exponentially increased. Accordingly, to solve a problem of the complexity of the ML detection, a V-BLAST-based soft iterative decoding method for obtaining a quasi-optimum solution by performing nulling-cancellation has been actively studied. However, the performance of quasi-optimum detection-based soft iterative decoding methods including zero forcing (ZF) and minimum mean square error (MIMSE) equalization is deteriorated, compared to ML detection-based methods.

Various efforts have been made to reduce the complexity of the ML in the MIMO system. Among the efforts, a sphere decoding method has been actively studied (E. Viterbo and J. Boutrous, "A universal lattice code decoder for fading channels," IEEE Trans. Inform. Theory, vol 45, pp 1639-1642, July 1997). The sphere decoding method has been introduced in a Fincke-Posht algorithm, and it has been reintroduced in an uncoded system by Viterbi.

When the sphere decoding method is applied to a multiple antenna system, the complexity of the maximum likelihood is considerably reduced, but the problem of the complexity still remains. Accordingly, various studies have been performed to reduce the complexity of the sphere decoding algorithm, which reduces the complexity of the sphere decoding algorithm so that the sphere decoding algorithm may be actually realized. However, the studies for the sphere decoding algorithm have been proceeded to reduce the complexity and complement the algorithm under the uncoded MIMO environment. Vikalo has suggested a modified sphere decoding algorithm for performing soft iterative decoding by using a soft input soft output (SISO) in the coded MIMO system, which has drawn attention to the sphere decoding algorithm used when an iterative decoding process using a soft value is performed.

In an iterative decoding method according to the turbo principle by using decoding algorithms including a message passing algorithm (MPA) and a Bahl-Cocke-Jelinek-Raviv (BCJR) algorithm based on the modified sphere decoding algorithm by Vikalo (Vikalo, H, Hassibi, B and Kailath "Iterative decoding for MIMO channels via modified sphere decoding, "T.; Wireless Communications, IEEE Transactions on Volume 3, Issue 6, Nov. 2004 Page(s): 2299-2311), a coding gain that is close to an optimum value is obtained in respective channel convolutional codes (e.g., Convolution code, turbo code, LDPC).

However, the complexity caused when soft values for respective encoded bits are provided to a channel decoder in a SISO sphere decoding process may become a considerable problem as the number of antennas is increased.

As the prior art, in an iterative maximum a posterior (MAP) receiver having low complexity based on the sphere decoding (Seung Young Park, Soo Ki Choi, and Chung Gu Kang, "Complexity-Reduced Iterative MAP Receiver for Spatial Multiplexing Systems," IEE Proceedings of Communications, August 2004), the complexity is reduced since the sphere decoding algorithm is not applied to bits having a high reliability based on an extrinsic probability output from a MAP decoder. Even though the complexity of the SISO sphere decoding algorithm is reduced according to the prior art, the complexity still remains.

The iterative MAP receiver reduces the complexity caused by the optimum detection since the iterative MAP receiver partially performs the MAP detection under an assumption that an a priori probability of a transmission symbol has been informed.

In addition, a transaction entitled "On the Partial MAP detection with Applications to MIMO Channels," in IEEE Transaction on signal processing, Vol 53, No. 1, January 2005 by Jinho Choi, introduced a partial MAP rule having a performance that is similar to the performance obtained when an overall MAP detection is performed. The partial MAP rule is given as Equation 1.

$$\bar{s}_2 = \arg\max Pr(s_2), r_2 = r - H_2\bar{s}_2 \qquad \text{[Equation 1]}$$

$\bar{s}_2$ denotes a set of sub-transmission symbols having a maximum a priori probability for a set $s_2$ of sub-transmission symbols.

$$\min_{s_1} \frac{1}{N_0} \|r_2 - H_1 s_1\|^2 \leq C + \min_{s_2 \neq \bar{s}} \log \frac{Pr(\bar{s}_2)}{Pr(s_2)} \qquad \text{[Equation 2]}$$

C denotes a Euclidean distance between a receipt vector and a set of subcarrier symbols estimated to have a second highest a priori probability next to $\bar{s}_2$.

N denotes a noise variance.

$$\bar{s}_1 = \min_{s_1} \frac{1}{N_0} \|r_2 - H_1 s_1\|^2 \qquad \text{[Equation 3]}$$

In Equations 1, 2, and 3, $s_1$ and $s_2$ denote sets of sub-transmission symbol vectors of transmission symbols s. $r_1$ and $r_2$ denote sub-receipt symbols. $H_1$ and $H_2$ denote sub-channel matrixes of an overall channel matrix.

When Equation 2 is satisfied, the optimum detection performance for all the symbols may be achieved only by performing the optimum detection for $\bar{s}_1$ (here, $\bar{s}_1$ denotes a set of sub-transmission symbol vectors minimizing an Euclidean distance to a sub-receipt symbol vector $r_2$ of the sub-transmission symbol set $s_1$) in Equation 3.

Equations 4, 5, 6, and 7 respectively show a cost function-based partial MAP rule for preventing a performance degradation of the partial MAP when the a priori probability of the estimated transmission symbols is less than a reference value and there is no dominant sub-transmission symbol.

Equation 4 shows a cost function relating to the sub-transmission symbol set $s_1$.

$Pr(s_2)$ denotes an a priori probability of the sub-transmission symbol set $s_2$.

$$C(s_1) = E_{s_2}\left[\frac{1}{N_0}\|r - H_1s_1 - H_2s_2\|^2 + \log\frac{1}{Pr(s_1)}\right] \quad \text{[Equation 4]}$$

Equation 5 defines an average sub-symbol vector for the sub-transmission symbol set $s_2$ when there is no dominant a priori probability.

$$\tilde{s}_2 = \sum_{s_2} s_2 Pr(s_2) \quad \text{[Equation 5]}$$

Equation 6 shows a process for finding $\tilde{s}_{app,1}$ which is an approximated $s_1$ for minimizing a cost function for the sub-transmission symbol set $s_1$.

$$\tilde{s}_{app,1} = \underset{s_1}{\operatorname{argmin}} C(s_1) = \underset{s_1}{\operatorname{argmin}} \frac{1}{N_0}\|r_2 - H_1s_1\|^2, \quad \text{[Equation 6]}$$

here $r_2 = r - H_2\tilde{s}_2$

A cost function for the sub-transmission symbol set $s_2$ is given as Equation 7.

$$C(s_2) = E_{s_1}\left[\frac{1}{N_0}\|r - H_1s_1 - H_2s_2\|^2 + \log\frac{1}{Pr(s_2)}\right] \quad \text{[Equation 7]}$$

Equation 8 shows an average symbol vector of the $\tilde{s}_{app,1}$ calculated in Equation 6.

$$\tilde{s}_1 = \sum_{s_1} \tilde{s}_{app,1} Pr(\tilde{s}_{app,1}) \quad \text{[Equation 8]}$$

In Equation 9, $\tilde{s}_{app,2}$, an approximated $s_2$ for minimizing a cost function for the sub-transmission symbol vector set $s_2$, is calculated.

When there is no dominant a priori probability, the iterative MAP receiver calculates the average symbol vector and the received sub-symbol vector by using the a priori probability of a corresponding sub-symbol vector and symbols in the cost function, and applies the partial MAP rule.

$$\tilde{s}_{app,2} = \underset{s_2}{\operatorname{argmin}} C(s_2) = \underset{s_2}{\operatorname{argmin}} \frac{1}{N_0}\|r_1 - H_2s_2\|^2, \quad \text{[Equation 9]}$$

-continued here $r_1 = r - H_1\tilde{s}_1$

In the partial MAP rule according to the prior art, it is assumed that the a priori probability is detected in an early detection process, but it is assumed, in an actual system, that the a priori probabilities for the respective transmission symbols are the same.

Accordingly, in a channel encoding MIMO system, the conventional partial MAP rule may not be applied in the early detection process. In addition, in the multiple antenna system, when the partial MAP using the partial MAP rule is detected, the calculating complexity is problematically increased as the number of antennas and modulation exponents are increased.

There is a problem in realizing the channel encoding MIMO system since the ML/sphere decoding operation based on the optimum detection has the considerable complexity as the number of antennas and modulation exponents is increased when the iterative decoding for the optimum performance is performed. In addition, the SISO sphere decoding based on the optimum detection has the considerable complexity as the number of antennas and modulation exponents are increased in the multiple antenna system.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an iterative decoding receiver for reducing complexity of a partial sphere decoding operation in a spatial multiplexing system, and reducing a complexity of a soft input soft output (SISO) sphere decoding operation in the iterative decoding receiver using Bahl-Cocke-Jelinek-Raviv (BCJR), message passing algorithm (MPA), and Viterbi algorithm (VA) decoding algorithms in a channel encoding multiple antenna system, and a method thereof.

An exemplary iterative decoding receiver according to an embodiment of the present invention reduces a complexity of a partial sphere decoding operation in a spatial multiplexing system.

The exemplary iterative decoding receiver includes a reliability estimator, a demapper, a maximum a posterior (MAP) detection-based partial soft input soft output (SISO) sphere decoder, an adder, a deinterleaver, a SISO decoder, an interleaver, and an a priori probability divider. The reliability estimator divides symbols received through multiple antennas into sub-transmission symbols $s_2$ estimated to have an a priori probability of a transmission symbol that is higher than a first reference value and sub-transmission symbols $s_1$ estimated to have an a priori probability of the transmission symbol that is lower than the first reference value, in a quasi-optimum detection method (e.g., minimum mean square error (MMSE) and zero forcing (ZF) methods). The demapper receives the sub-transmission symbols $s_2$ estimated, based on detection reliability, of which the a priori probability of the transmission symbol is higher than the first reference value from the reliability estimator, and generates soft values of corresponding sub-transmission symbols. The MAP detection-based partial SISO sphere decoder SISO sphere decodes the sub-transmission symbols $s_1$ estimated to have an a priori probability of the transmission symbol that is lower than the first reference value. The adder receives the soft values of corresponding sub-symbols and an extrinsic probability having a reliability increased to be higher than the first reference value by the MAP detection-based partial SISO sphere decoder, and adds the soft values and the extrinsic probability. The deinterleaver receives the extrinsic probability of encoded bits output from the adder, and deinterleaves interleaved bits to change an order of the interleave bits into an original bit order. The SISO decoder decodes an output signal of the deinterleaver in a decoding algorithm. The interleaver interleaves the extrinsic probability output from the SISO decoder, and generates a priori probabilities corresponding to transmission symbols. The a priori probability divider receives the a priori probabilities corresponding to the transmission symbols from the interleaver, and divides transmission symbols into a set of sub-transmission symbols directly input to the adder and a set of sub-transmission symbols input to the MAP detection-based partial SISO sphere decoder based on the a priori probabilities.

In an exemplary iterative decoding receiving method for reducing a complexity of a partial SISO sphere decoding operation in a spatial multiplexing system according to an embodiment of the present invention, a) symbols received from multiple antennas are divided into a set $s_2$ of sub-transmission symbols estimated to have an a priori probability of a transmission symbol that is higher than a first reference value and a set $s_1$ of sub-transmission symbols estimated to have an a priori probability that is lower than the first reference value, based on a transmission symbol detection reliability estimated in a quasi-optimum detection method (zero forcing (ZF) or minimum mean square error (MMSE) method), b) the sub-transmission symbols $s_2$ estimated to have the higher a priori probability of the transmission symbol are received, and a soft value (extrinsic probability value) of the corresponding sub-transmission symbols is generated, c) the set of the sub-transmission symbols $s_1$ estimated to have the a priori probability of the divided transmission symbols is SISO sphere decoded according to a partial maximum a posterior (MAP) rule, d) the calculated soft value of the corresponding sub-transmission symbols is received, the extrinsic probability of the reliability that is increased to higher than the first reference value by performing the SISO sphere decoding operation according to the partial MAP rule is received, and the soft value and the extrinsic probability are added, e) the added extrinsic probability is deinterleaved to have an original bit order, f) a deinterleaved signal is SISO decoded in a predetermined decoding algorithm, g) sub-transmission symbols to be input to an SISO sphere decoder according to the partial MAP rule are divided based on an a priori probability of the SISO decoded and interleaved bit, and h) the extrinsic probability of bits output by applying the SISO sphere decoding operation according to the partial MAP rule and the extrinsic probability of bits output without applying the SISO sphere decoding operation are received, and an iterative decoding operation is performed.

DETAILED DESCRIPTION OF THE EMBODIMENTS

Figure 1:
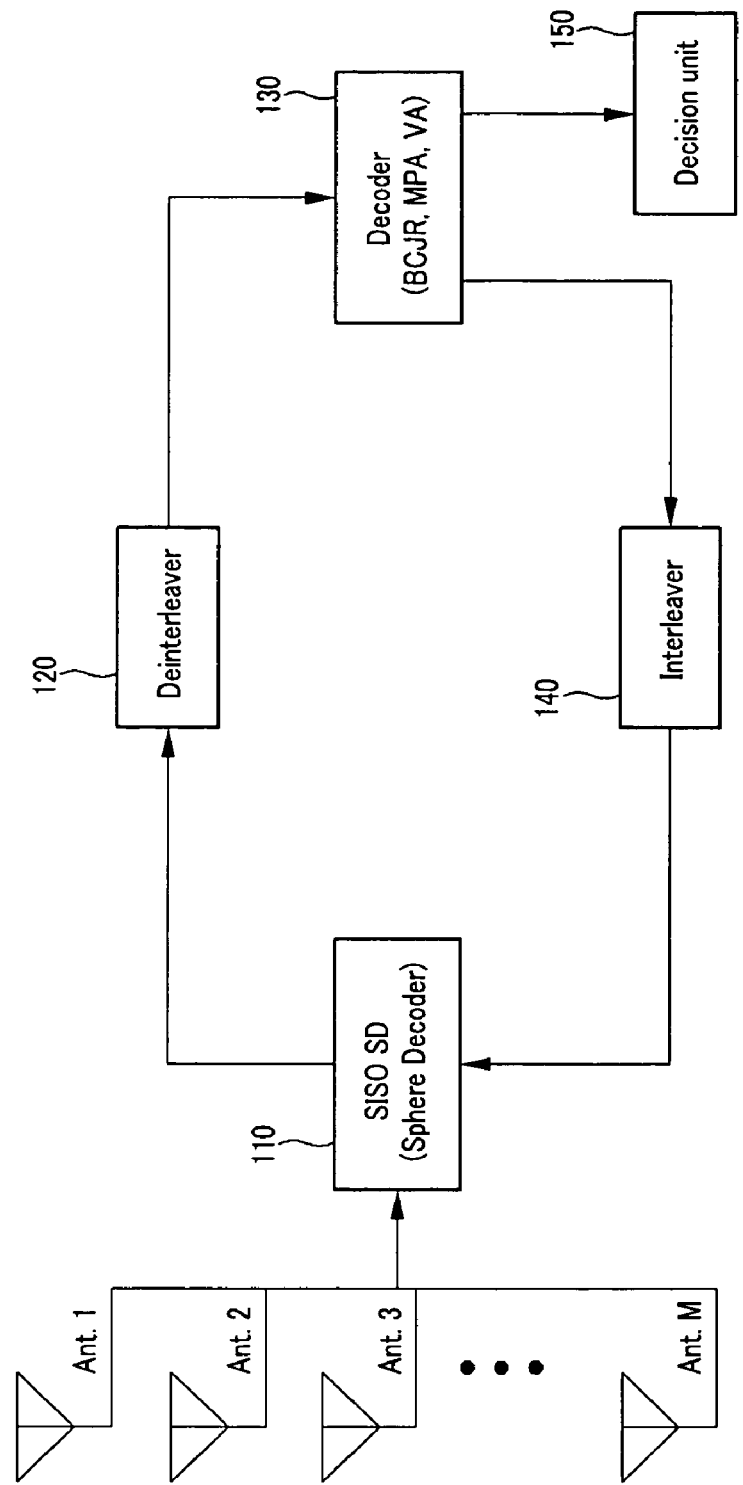
FIG. 1 shows a diagram of a receiver for performing a soft iterative decoding operation in a channel encoding multiple antenna system according to an exemplary embodiment of the present invention.

The present invention now will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprise" or variations such as "comprises" or "comprising" will be understood to imply the inclusion of stated elements but not the exclusion of any other elements.

In addition, the word "module" will be understood to indicate a unit for processing a predetermined function or operation, which may be realized by hardware, software, or a combination thereof.

An exemplary embodiment of the present invention will hereinafter be described in detail with reference to the accompanying drawings.

The present invention provides a method for reducing complexity of an optimum detection sphere decoding operation in an iterative decoder based on a partial sphere decoding operation in a channel encoding multiple antenna system.

In the iterative decoder based on the partial sphere decoding operation in the channel encoding multiple antenna system, detection reliability is initially detected when a quasi-optimum detection method such as a zero forcing (ZF) method and a minimum mean square error (MMSE) method is performed, and a soft value is directly inputted to a channel decoder when a transmission symbol has a detection reliability that is higher than a reference value.

In the iterative decoder based on partial sphere decoding, a soft value of transmission symbols having reliability increased by the optimum detection sphere decoding is input to the channel decoder when the transmission symbol has detection reliability that is lower than the reference value.

In the above process, since the partial sphere decoding operation of the transmission symbol is performed according to a partial MAP rule, a performance degradation caused by an estimation error of an initial quasi-optimum detection process is compensated, and an optimum performance may be achieved.

When an iterative decoding operation is performed, a complexity output by the optimum detection operation is considerably reduced since a sphere decoding algorithm is partially applied to the received transmission symbols.

FIG. 1 shows a diagram of a receiver for performing a soft iterative decoding operation in a channel encoding multiple antenna system according to an exemplary embodiment of the present invention.

As shown in FIG. 1, the receiver for performing the soft iterative decoding operation in the channel encoding multiple antenna system includes a soft input soft output (SISO) sphere decoder 110 connected to multiple antennas, a deinterleaver 120, a decoder 130, an interleaver 140, and a decision unit 150.

The SISO sphere decoder 110 performs a sphere decoding operation based on optimum detection for transmission symbol data received from the multiple antennas.

The deinterleaver 120 receives an extrinsic probability of bits output by the SISO sphere decoder, and performs a deinterleave operation for changing an order of interleaved bits into an original bit order.

The decoder 130 decodes the extrinsic probability of encoded bits output by the deinterleaver 120 in a decoding algorithm such as a Bahl-Cocke-Jelinek-Raviv (BCJR) algorithm, a message passing algorithm (MPA), and a Viterbi algorithm (VA).

The interleaver 140 receives the extrinsic probability of the encoded bits from the decoder 130, interleaves an order of decoded bits for preventing a burst error caused by a deep fading operation, and provides an a priori probability of the SISO sphere decoding.

The determining unit 150 determines, based on probability information of the decoded bits, whether corresponding bits are 0 or 1 when a decoding operation of the decoder 130 is finished.

Since the SISO sphere decoder 110 for obtaining a soft value based on the optimum detection performs the sphere decoding operation for all transmission symbols, a complexity thereof is problematically increased as the number of antennas and modulation exponents are increased.

Figure 2:
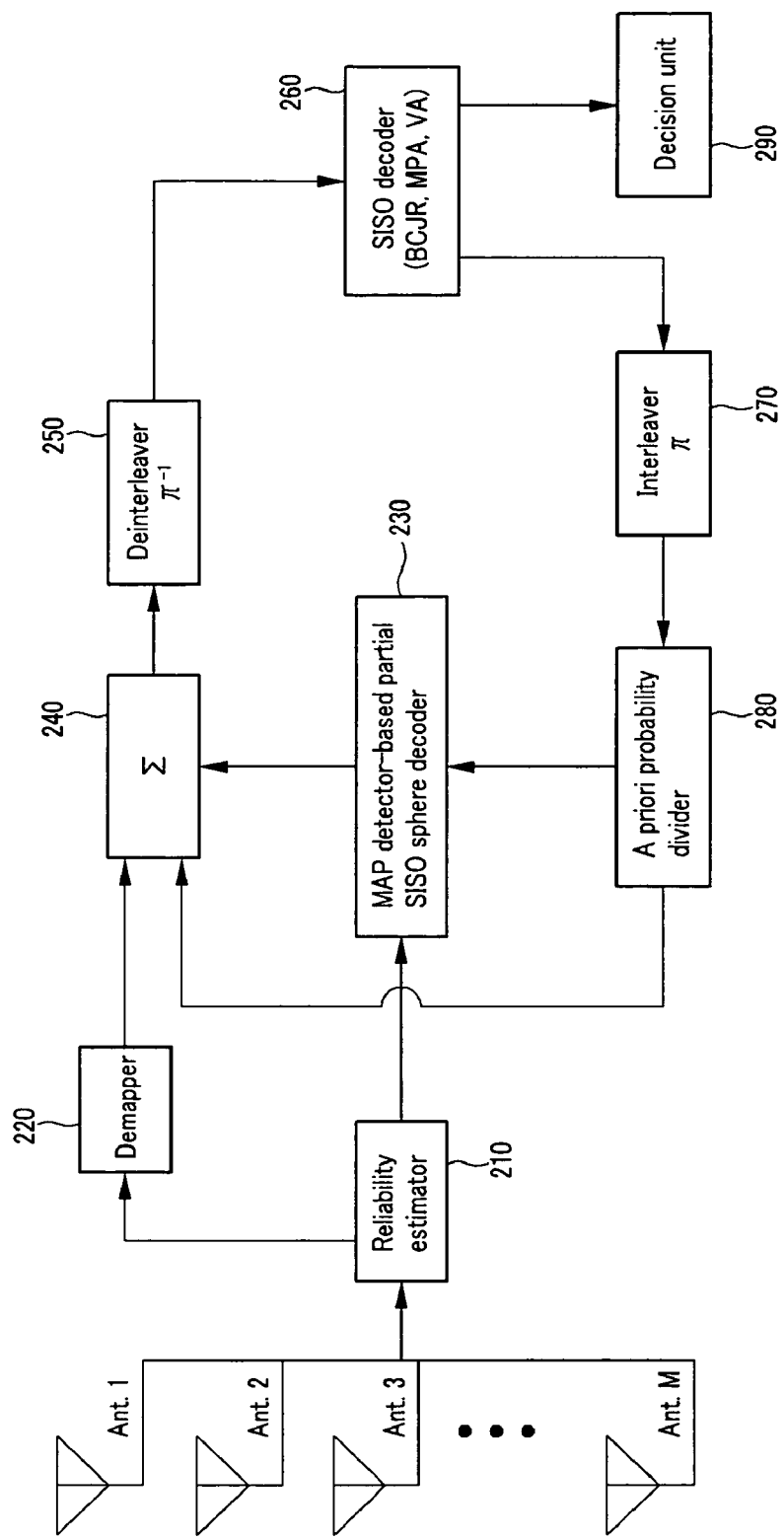
FIG. 2 shows a schematic diagram of a receiver for performing iterative decoding based on a partial SISO sphere decoding operation according to an exemplary embodiment of the present invention.

FIG. 2 shows a schematic diagram of a receiver for performing iterative decoding based on the partial SISO sphere decoding according to an exemplary embodiment of the present invention. In FIG. 2, the complexity of the SISO sphere decoding in the receiver shown in FIG. 1 is considerably reduced.

As shown in FIG. 2, the receiver for performing the iterative decoding operation based on the partial SISO sphere decoding according to the exemplary embodiment of the present invention includes a reliability estimator 210 connected to the multiple antennas, a demapper 220, a MAP detector-based partial SISO sphere decoder 230, an adder 240, a deinterleaver 250, a SISO decoder 260, an interleaver 270, an a priori probability divider 280, and a decision unit 290.

The reliability estimator 210 performs quasi-optimum detection (MMSE or ZF) for the symbols received through the multiple antennas, and divides a sub-transmission symbol set into a sub-transmission symbol set $s_1$ having a transmission symbol a priori probability that is lower than a reference value, and a sub-transmission symbol set $s_2$ having a transmission symbol a priori probability that is higher than the reference value.

For the set $s_2$ of the sub-transmission symbols estimated to have the higher a priori probability for the estimated transmission symbols (i.e., the a priori probability that is higher than the reference value), the reliability estimator 210 inputs soft values for the corresponding sub-transmission symbols (here, the soft values are calculated by the demapper 220) to the adder 240. The reliability estimator 210 provides the set $s_1$ of the transmission symbols estimated to have the a priori probability that is lower than the reference value to the MAP detector-based partial SISO sphere decoder 230.

The demapper 220 receives the sub-transmission symbols estimated to have the a priori probability that is higher than the reference value from the reliability estimator 210 based on the detection reliability, and calculates the soft values (extrinsic probabilities) of the corresponding sub-transmission symbols.

The MAP detector-based partial SISO sphere decoder 230 receives the sub-transmission symbols $s_1$ estimated to have the a priori probability of the transmission symbols that is lower than the reference value, and performs SISO sphere decoding for the sub-transmission symbols $s_1$.

The MAP detector-based partial SISO sphere decoder 230 inputs the extrinsic probability that is increased to have the a priori probability that is higher than the reference value to the adder 240.

Here, a method for performing the soft cancellation by providing a weight value corresponding to double the a priori probability of the encoded bit from the channel decoder, calculating an average symbol vector, forming a cost function, and performing iterative detecting and decoding operations in the cost function, will be referred to as an iterative partial sphere decoding method based on a soft cancellation.

The adder 240 receives the transmission symbols $s_2$ estimated to have the a priori probability that is higher than the reference value, the soft values of the corresponding symbols that are calculated by the demapper 220, and the extrinsic probability that is increased to have the reliability that is higher than the reference value from the MAP detector-based partial SISO sphere decoder 230, adds them, and provides them to the deinterleaver 250.

The extrinsic probability of the encoded bits that is output from the adder 230 is input to the SISO decoder 260 through the deinterleaver 250 so that the encoded bits may be decoded in a corresponding algorithm (BCJR, MPA, or VA).

The deinterleaver 250 deinterleaves the extrinsic probability of the encoded bits output from the adder 230.

The SISO decoder (BCJR, MPA, or VA) 260 receives the deinterleaved signal, and SISO decodes the deinterleaved signal in a decoding algorithm such as the BCJR, MAP, MPA, or Viterbi Algorithm.

The SISO decoder 260 outputs the extrinsic probabilities to the interleaver 270 to generate the a priori probability corresponding to the transmission symbols.

The interleaver 270 interleaves the extrinsic probabilities output from the SISO decoder 260, and generates the a priori probability corresponding to the transmission symbols.

The a priori probability divider 280 receives the a priori probabilities corresponding to the generated transmission symbols, divides the sub-transmission symbols into a set of sub-transmission symbols that are directly input to the adder 240 and a set of sub-transmission symbols that are input to the MAP detector-based partial SISO sphere decoder 230 based on the a priori probabilities, and iteratively decodes them.

In a method for dividing the transmission symbols into the sub-transmission symbols by the a priori probability divider 280, when the number of iterative operations is lower than a reference value (when a speed for collecting the bit probabilities at a decoding process is slower than a reference value), the sub-transmission symbol sets $s_1$ and $s_2$ that are divided at the quasi-optimum detection process are alternately divided to be provided to the MAP detector-based partial SISO sphere decoder 230.

When the number of iterative operations is higher than the reference value, the sub-transmission symbol sets $s_1$ and $s_2$ are alternately divided at early iterative decoding operations to be provided to the MAP detector-based partial SISO sphere decoder 230.

To perform the partial SISO sphere decoding, the sub-transmission symbols having the higher a priori probability for the transmission symbol output from the SISO decoder 260 and the sub-transmission symbols having the lower a priori probability than the reference value are divided, and symbols forming $s_1$ and $s_2$ are updated.

That is, while the sub-transmission symbol set $s_1$ having the lower a priori probability for the transmission symbol is provided to the MAP detector-based partial SISO sphere decoder 230, the probability value of the sub-transmission symbol set $s_2$ having the higher a priori probability for the transmission symbol is provided to the adder 240. Alternately, while the sub-transmission symbol set $s_2$ having the higher a priori probability for the transmission symbol is provided to the MAP detector-based partial SISO sphere decoder 230, the probability value of the sub-transmission symbol set $s_1$ having the lower a priori probability for the transmission symbol is provided to the adder 240.

Since the probability values of the corresponding bits are not varied in a decoder having a collecting speed faster than the reference value after performing a few iterative decoding operations, errors of the symbols estimated in the quasi-optimum detection method are not corrected when the number of decoding operations is increased.

In the above-described method, the iterative decoding operation based on the partial sphere decoding is performed.

An operation of the decision unit 290 is performed when the decoding operation of the SISO decoder 260 is finished.

Figure 3:
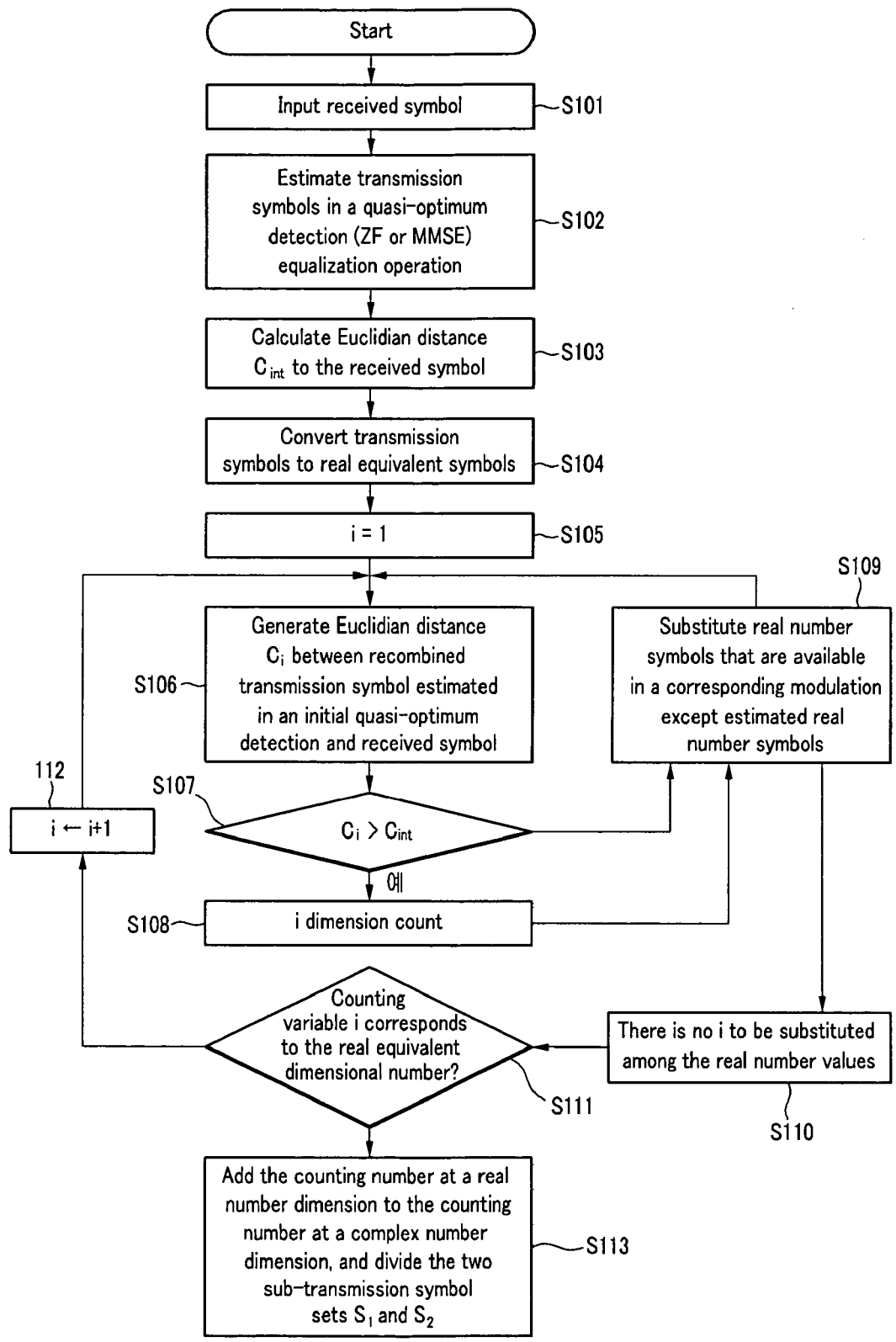
FIG. 3 shows a flowchart for representing an algorithm of a reliability estimator shown in FIG. 2 according to the exemplary embodiment of the present invention.

FIG. 3 shows a flowchart for representing an algorithm of the reliability estimator shown in FIG. 2 according to the exemplary embodiment of the present invention.

Referring to FIG. 3, the reliability estimator 210 may divide the sub-transmission symbols into the set $s_2$ of the sub-transmission symbols estimated to have the higher a priori probability of the transmission symbol and the set $s_1$ of the sub-transmission symbols estimated to have the lower a priori probability.

The reliability estimator 210 receives the symbols from the multiple antennas in step S101, estimates transmission symbols in a quasi-optimum detection (ZF or MMSE) equalization operation in step S102, calculates an Euclidian distance $C_{int}$ to the received symbol in step S103 by substituting available real number symbol values for a signal of the corresponding modulation method except real number symbol values estimated in a real equivalent dimension, and converts the transmission symbol to the real equivalent symbol in step S104.

The reliability estimator 210 initializes a counting variable i (here, i=1) in step S105, and generates a Euclidian distance $C_i$ between the recombined transmission symbol estimated in an initial quasi-optimum detection and the received symbol in step S106.

When the Euclidian distance $C_{int}$ is lower than the Euclidian distance $C_i$ between the recombined transmission symbol and the received symbol (i.e., $C_i > C_{int}$) after comparing the two Euclidian distances $C_{int}$ and $C_i$, the reliability estimator 210 performs a counting operation at an i dimension (here, i is an integer of more than 1) in step S108.

When $C_i > C_{int}$ is not satisfied or after performing the step S108, the reliability estimator 210 substitutes the real number symbols that are available in the corresponding modulation except the estimated real number symbols in step S109.

When there is no i (here, i is an integer of more than 1) to be substituted among the real number values in step S110, it is determined in step S111 whether the counting variable i corresponds to the real equivalent dimensional number.

When the counting variable i does not correspond to the real equivalent dimensional number, a dimensional index is increased by +1 (here, i←i+1) in step S112.

When the counting variable i corresponds to the real equivalent dimensional number, the reliability estimator 210 adds the counting number at a real number dimension to the counting number at a complex number dimension, and divides the two sub-transmission symbol sets $s_1$ and $s_2$ in step S113.

The detection reliability of the transmission symbol in a corresponding dimension is lower than a predetermined reference value as the count number is increased compared to the reference value, and the reliability estimator 210 estimates the received transmission symbols to be the sub-transmission symbol set $s_1$ estimated to have the a priori probability that is lower than the reference value.

In addition, when the count number for the corresponding transmission symbol is less than a predetermined reference value, the reliability estimator 210 estimates the received transmission symbols to be the sub-transmission symbol set $s_2$ estimated to have the a priori probability that is higher than the reference value.

Figure 4:
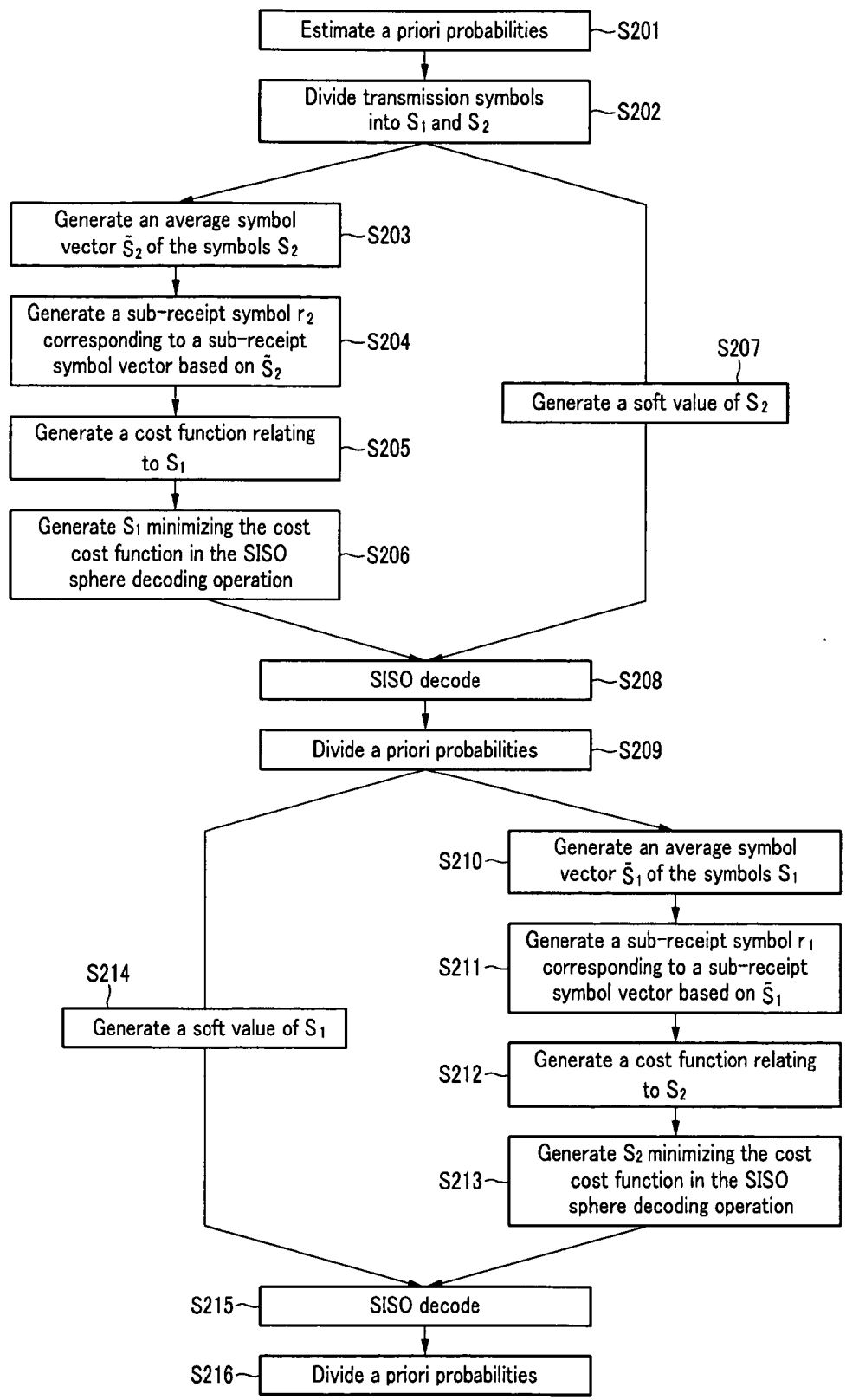
FIG. 4 shows a flowchart for representing iterative detection and decoding processes when the partial SISO sphere decoding is applied to the cost function-based partial MAP rule, according to the exemplary embodiment of the present invention.

FIG. 4 shows a flowchart for representing iterative detection and decoding processes when the partial SISO sphere decoding is applied to the cost function-based partial MAP rule, according to the exemplary embodiment of the present invention.

In more detail, FIG. 4 shows a flowchart for representing a process for performing the iterative decoding using the reliability estimator 210 according to the exemplary embodiment of the present invention while performing the partial SISO sphere decoding operation according to the cost function-based partial MAP rule when the detection reliability for the divided sub-transmission symbols is reduced (i.e., when there is no set of the sub-transmission symbols having the dominant a priori probability).

The reliability estimator 210 estimates the a priori probabilities of the transmission symbols received through the multiple antennas in step S201, performs the quasi-optimum detection (MMSE or ZF) for the received transmission symbols, and divides the sub-transmission symbols into the sub-transmission symbols $s_1$ estimated to have the a priori probability that is lower than the reference value and the sub-transmission symbols $s_2$ estimated to have the a priori probability that is higher than the reference value in step S202.

The reliability estimator 210 generates an average symbol vector $\tilde{s}_2$ of the symbols $s_2$ estimated to have the a priori probability that is higher than the reference value in step S203, and generates a sub-receipt symbol $r_2$ corresponding to a sub-receipt symbol vector based on $\tilde{s}_2$ in step S204.

The partial SISO sphere decoder 230 generates a cost function relating to the sub-transmission symbol set $s_1$ having a relatively low reliability among the sub-transmission symbol sets $s_1$ and $s_2$ divided by the reliability estimator 210 in step S205.

The sub-transmission symbol set $s_1$ minimizing the cost function is generated in the SISO sphere decoding operation in step S206, and inputs the corresponding extrinsic probability to the SISO sphere decoder 260 in step S208.

The sub-transmission symbol set $s_2$ estimated to have the a priori probability that is higher than the reference value is not applied in the partial SISO sphere decoding.

The demapper 220 calculates a soft value (the extrinsic probability value) of the sub-transmission symbol set $s_2$ estimated to have the a priori probability that is higher than the reference value in step S207, and inputs the soft value to the SISO sphere decoder 260 through the deinterleaver 250 in step S208.

The a priori probability divider 280 generates an average symbol vector $\tilde{s}_1$ corresponding to the sub-transmission symbol set $s_1$ based on the a priori probability output from the SISO sphere decoder 260 in step S210, and generates the sub-receipt symbol corresponding to the sub-receipt symbol vector $r_1$ based on $\tilde{s}_1$ in step S211.

The MAP detector-based partial SISO sphere decoder 230 generates a cost function relating to the sub-transmission symbol set $s_2$ estimated to have the a priori probability that is lower than the reference value in step S212, and input the cost function to the adder 240.

The SISO decoder 260 generates $s_2$ minimizing the cost function in the SISO sphere decoding in step S213. Then, the SISO decoder 260 receives the generated extrinsic probability value, and SISO-decodes the extrinsic probability value in step S215.

In cooperation with the MAP detector-based partial SISO sphere decoder 230, the iterative decoder generates the soft value (the extrinsic probability value) of the sub-transmission symbol set $s_1$ of the encoded bits a predetermined number of times, and performs the iterative decoding in step S214.

For the extrinsic probability corresponding to the sub-transmission symbol set $s_2$, the extrinsic probability generated at the previous iterative decoding operation is used in step S216.

Performance degradation is caused when it is difficult to divide a set of transmission symbols having an a priori probability that is higher than a second reference value and a set of transmission symbols having an a priori probability that is lower than the second reference value since the detection reliability is lower than a first reference value, and the performance degradation of the partial SISO sphere decoding according to the partial MAP rule is compensated through the above iterative decoding operation.

Basically, in the iterative decoding based on the cost function-based SISO sphere decoding, the compensation for performance degradation is maximized. In addition, calculation complexity is increased as a modulation exponent is increased when the average symbol of the sub-transmission symbols is generated. Accordingly, in the exemplary embodiment of the present invention, the average symbol is calculated in the soft cancellation method for calculating a product of the a priori probabilities of the encoded bits in hard-decision symbols generated by the SISO decoder, and multiplying the product by the hard-decision symbols.

In addition, a method for using a hard-decision symbol vector generated by the SISO decoder when the average symbol vector is generated will be referred to as a hard cancellation method.

The average symbol vector is calculated in the hard cancellation method as shown in Equation 10.

The average symbol vector is calculated in the soft cancellation method as shown in Equation 11. In Equation 11, $Pr(u_k)$ denotes an a priori probability of a $k^{th}$ encoded bit among M bits (M is an integer greater than 1) output from the SISO decoder 260.

$$\tilde{s}_{i,j} = s_{i,j} \ (i=1,2; j=1,2, \ldots, N_i) \quad \text{[Equation 10]}$$

$$\tilde{s}_{i,j} = s_{i,j} \cdot \Pi_{k=1}^{M} Pr(u_k) \quad \text{[Equation 11]}$$

Figure 5:
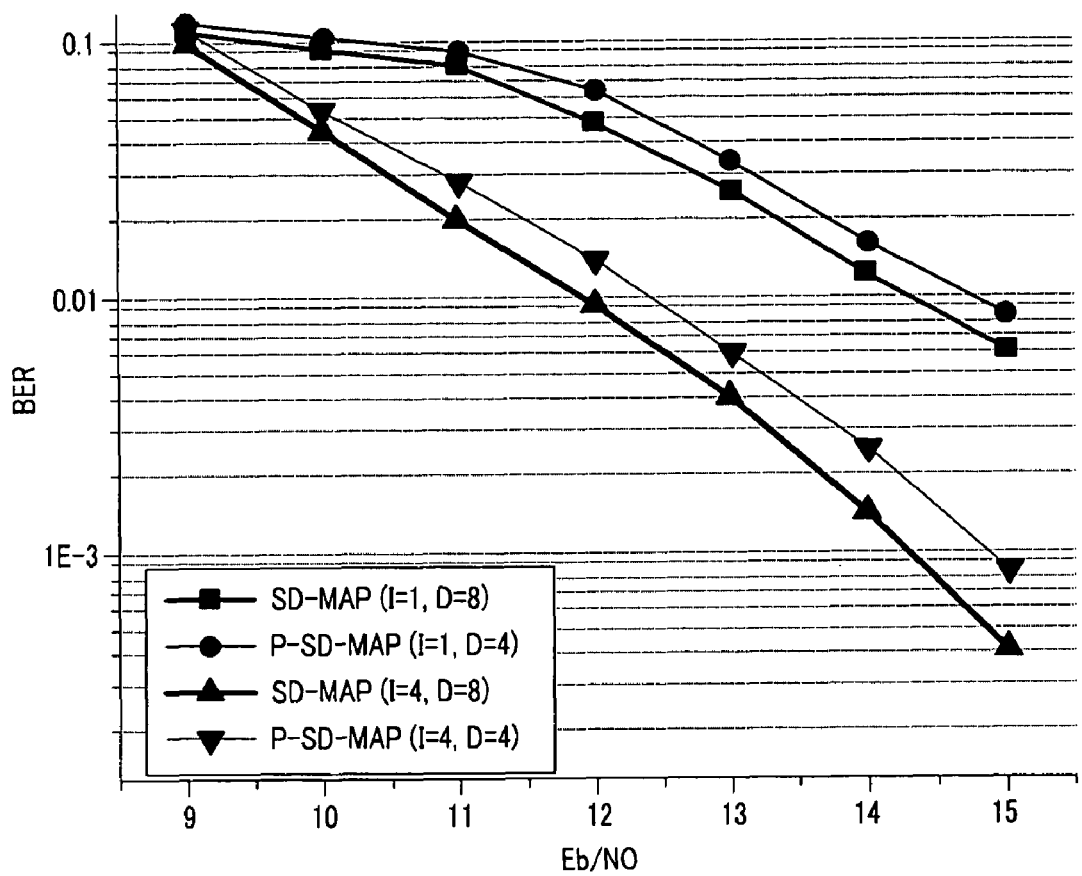
FIG. 5 shows a graph of a simulation result showing a performance analysis when the SISO sphere decoding and the MAP decoding are used for all the transmission vector dimensions (D=8, a real metric) and when the SISO sphere decoding algorithm is used for a half of all the transmission vector dimensions (D=4).

FIG. 5 shows a graph of a simulation result showing a performance analysis when the SISO sphere decoding and the MAP decoding are used for the entire transmission vector dimension (D=8, a real metric) and when the SISO sphere decoding algorithm is used for a half of the entire transmission vector dimension (D=4).

Referring to FIG. 5, a simulation is performed in a model formed by a 4×4 flat fading MIMO channel, a 16-QAM, a convolutional code of R=½, a partial SISO sphere decoding, and a MAP decoder. Initial transmission symbol and channel estimation is performed in a minimum mean square error (MMSE) method. Iterative partial sphere decoding based on the soft cancellation method is performed in the iterative detection and decoding method according to the exemplary embodiment of the present invention. When the number of antennas is 4, the number I of the iterative decoding operations is from 1 to 4.

Since a coding gain is obtained while an initial estimation error is compensated by the partial SISO sphere decoding-MAP decoder as the number of the iterative operations is increased, the partial SISO sphere decoding-MAP decoder performing the optimum detection for the half of all the transmission symbol vector dimensions shows a performance difference of 0.7 dB, compared to the SISO sphere decoding-MAP decoder showing the optimum performance by performing the optimum detection for all the transmission symbol vectors.

Figure 6:
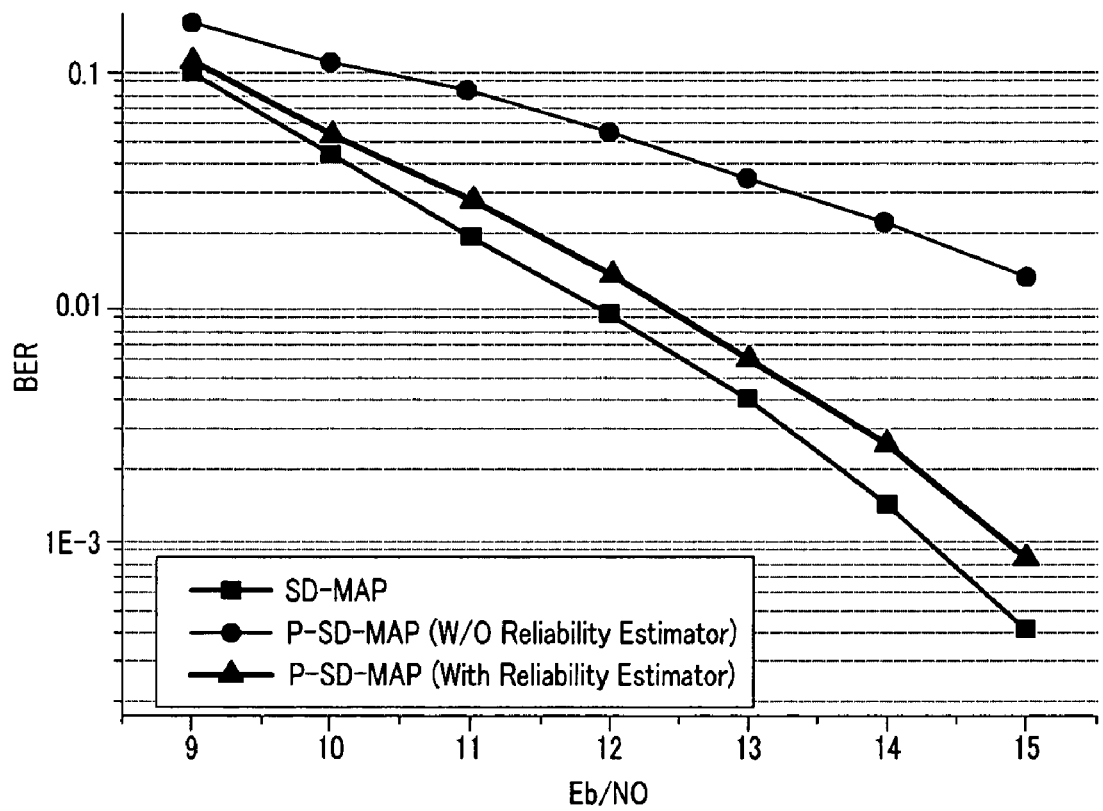
FIG. 6 shows a graph of a simulation result showing an effect of the reliability estimator.

FIG. 6 shows a graph of a simulation result showing an effect of the reliability estimator.

In more detail, FIG. 6 shows a simulation result obtained by comparing two cases. In one of the two cases, the respective symbol vectors are sequentially divided into two sub-symbol vectors by using the reliability estimator 210, and, in the other case, the respective symbol vectors are sequentially formed by two sub-symbol vectors without using the reliability estimator 210. In the simulation result, since there are some cases that are not satisfied with the partial MAP rule, and the performance of the partial MAP is deteriorated when the symbol vector is divided into two sub-symbol vectors without using the reliability estimator 210 compared to the symbol vector divided by using the reliability estimator 210, the performance difference may occur when the reliability estimator 210 is initially applied, FIG. 7 shows a graph comparing the performances in the hard cancellation and soft cancellation methods when the average symbol vector of the partial SISO sphere decoding-MAP decoder is generated.

Figure 7:
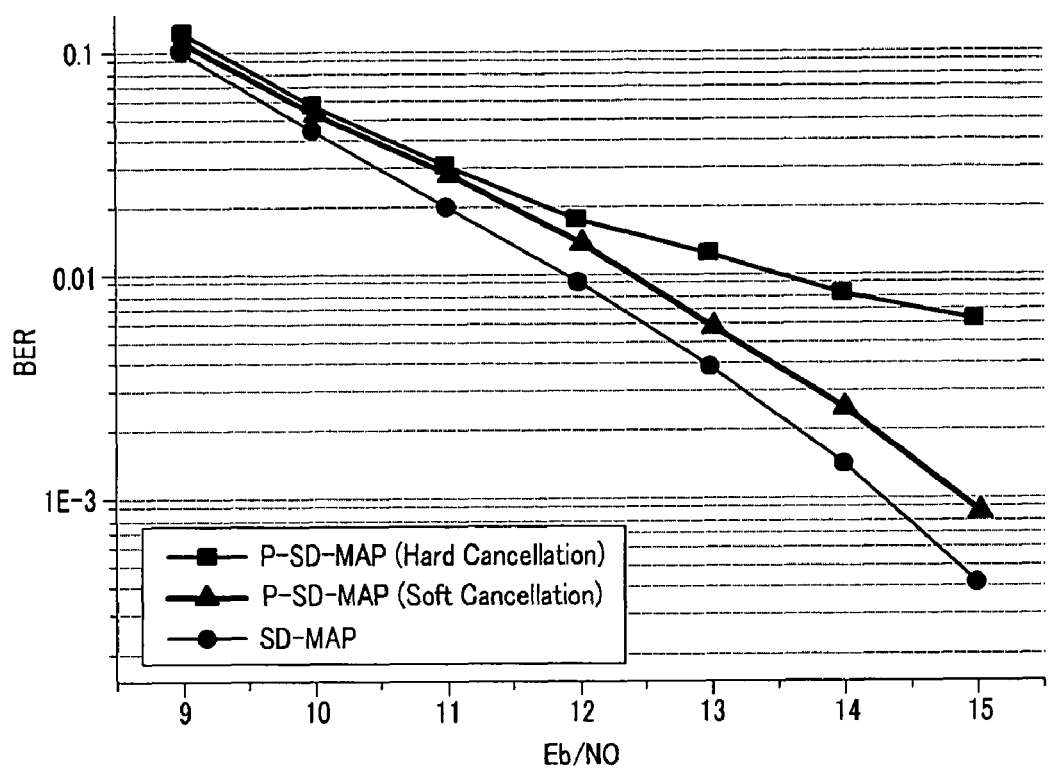
FIG. 7 shows a graph comparing performances in hard cancellation and soft cancellation methods when an average symbol vector of the partial SISO sphere decoding-MAP decoder is generated.

Referring to FIG. 7, when the average symbol vector is generated in the soft cancellation, an error floor is eliminated and the performance is increased.

Figure 8:
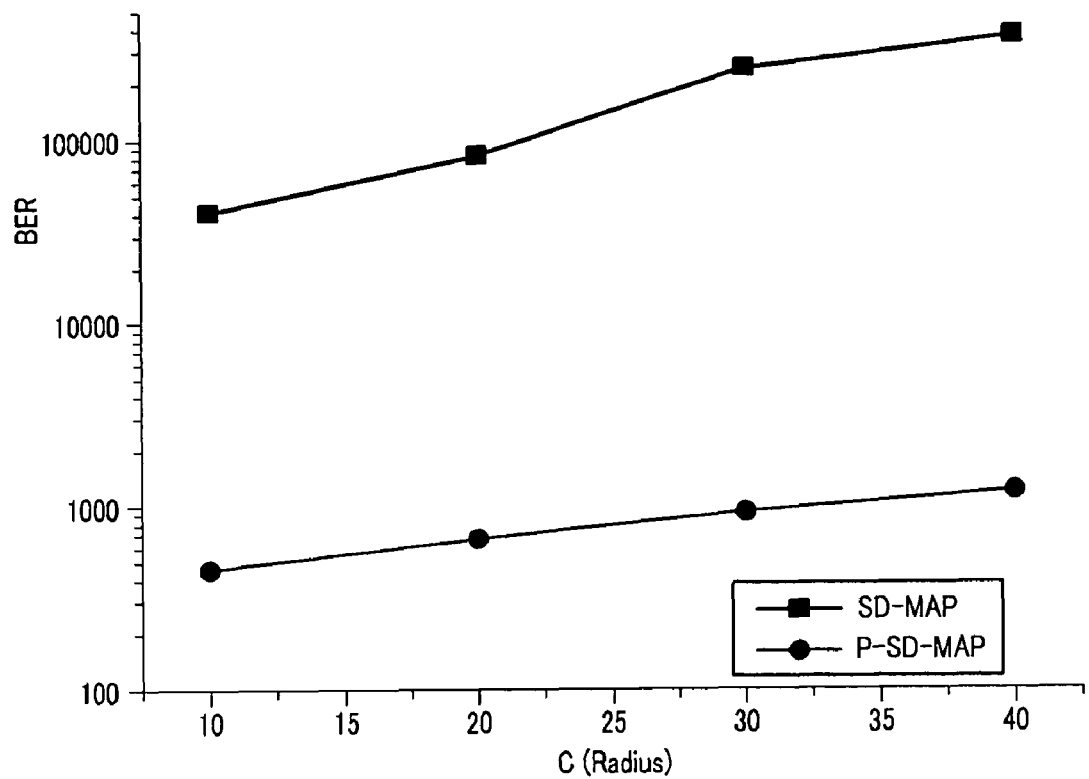
FIG. 8 shows a graph of a simulation result obtained by comparing complexities between the partial SISO sphere decoding-MAP decoder and the SISO sphere decoding-MAP decoder.

FIG. 8 shows a graph of a simulation result obtained by comparing complexities between the partial SISO sphere decoding-MAP decoder and the SISO sphere decoding-MAP decoder, which illustrates a number of floating point operations performed when applying the sphere decoding algorithm according to each initial radius.

In FIG. 8, the number of floating point operations of the SISO sphere decoder during four iterative decoding operations is averaged, and the number of floating point operations during one iterative decoding operation is calculated. In the simulation result, compared to the SISO sphere decoding-MAP decoder applying the sphere decoding algorithm for all the dimensions, the complexity is reduced by one hundredth or more when the partial SISO sphere decoding-MAP decoder is applied. Based on an initial radius 30, the number of the floating point operations of the partial SISO sphere decoding-MAP decoder and the SISO sphere decoding-MAP decoder are respectively 927 and 245,620.

According to the exemplary embodiment of the present invention, since the iterative decoding operation may be performed by using the SISO sphere decoder according to the partial MAP rule in the channel encoding multiple antenna system, the complexity of the SISO sphere decoding operation according to the increase of the number of antennas is considerably reduced. In addition, since the SISO sphere decoding operation is partially applied to some of the transmission symbols, the performance degradation may be prevented by performing the SISO sphere decoding operation in the partial MAP rule, and the optimum decoding performance may be obtained.

Therefore, according to the exemplary embodiment of the present invention, the optimum performance of the corresponding channel encoding may be obtained when the SISO sphere decoding is performed for all the transmission symbol dimensions, the soft value of the encoded bit is calculated, and the iterative decoding is performed.

The complexity is reduced by one hundredth when the partial SISO sphere decoder for a half of all the transmission symbol dimensions is used according to the exemplary embodiment of the present invention, compared to the SISO sphere decoder for all the dimensions of the received transmission symbols. Accordingly, the complexity close to the soft iterative decoding receiver in the quasi-optimum detection (V-BLAST) may be realized.

As described above, since the SISO sphere decoding is partially applied for some of transmission symbols as the number of antennas is increased in the channel encoding multiple antenna system, the complexity is considerably decreased, and the iterative detection and decoding operation for correcting the initial estimation error may be provided according to the exemplary embodiment of the present invention.

In addition, the set of the quasi-optimum detection-based sub-transmission symbols divided by the reliability estimator according to the detection reliability satisfies the partial MAP rule. When the precision of the detection reliability at the reliability estimator is reduced, the initial detection process error may be corrected by the iterative detection and decoding operation using the cost function-based partial MAP rule.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An iterative decoding receiver for reducing complexity of a partial sphere decoding operation in a spatial multiplexing system, the iterative decoding receiver comprising:
   a reliability estimator for dividing symbols received through multiple antennas into sub-transmission symbols $s_2$ estimated to have an a priori probability of a transmission symbol that is higher than a first reference value and sub-transmission symbols $s_1$ estimated to have the a priori probability of the transmission symbol that is lower than the first reference value, in a quasi-optimum detection method;
   a demapper for receiving the sub-transmission symbols $s_2$ estimated, based on a detection reliability, to have the a priori probability of the transmission symbol that is higher than the first reference value from the reliability estimator, and generating soft values of the corresponding sub-transmission symbols;
   a maximum posteriori (MAP) detection-based partial soft input soft output (SISO) sphere decoder for SISO sphere decoding the sub-transmission symbols $s_1$ estimated to have the a priori probability of the transmission symbol that is lower than the first reference value;
   an adder for receiving the soft values of corresponding sub-transmission symbols and an extrinsic probability having a reliability increased to be higher than the first reference value by the MAP detection-based partial SISO sphere decoder, and adding the soft values and the extrinsic probability;
   a deinterleaver for receiving the extrinsic probability of encoded bits output from the adder, and deinterleaving interleaved bits to change an order of the interleave bits into an original bit order;
   an SISO decoder for decoding an output signal of the deinterleaver in a decoding algorithm;
   an interleaver for interleaving the extrinsic probability output from the SISO decoder, and generating a priori probabilities corresponding to transmission symbols; and
   an a priori probability divider for receiving the a priori probabilities corresponding to the transmission symbols from the interleaver, and alternately dividing transmission symbols into a set of sub-transmission symbols directly input to the adder and a set of sub-transmission symbols input to the MAP detection-based partial SISO sphere decoder based on the a priori probabilities.

2. The iterative decoding receiver of claim 1, further comprising a decision unit for performing an operation when the SISO decoder finishes an iterative decoding operation.

3. The iterative decoding receiver of claim 1, wherein the reliability estimator performs an iterative decoding operation by performing partial SISO sphere decoding according to a cost function-based partial MAP rule when a detection reliability for the divided sub-transmission symbols is reduced to be less than a reference value.

4. The iterative decoding receiver of claim 1, wherein the SISO decoder performs a decoding operation in a Bahl-Cocke-Jelinek-Raviv (BCJR) algorithm, a message passing algorithm (MPA), or a Viterbi algorithm (VA).

5. The iterative decoding receiver of claim 1, wherein the a priori probability divider alternately provides the sub-transmission symbol sets s1 and s2 divided when the quasi-optimum detection is performed to the MAP detection-based partial SISO sphere decoder, divides the sub-transmission symbols s2 of which the a priori probability for the transmission symbol output from the SISO decoder is higher than the first reference value and the sub-transmission symbols s1 having the a priori probability that is lower than the first reference value, and provides the divided sub-transmission symbols s1 and s2 to the partial SISO sphere decoder.

6. The iterative decoding receiver of claim 1, wherein, when the number of iterative decoding operations is greater than a second reference value, the a priori probability divider alternately provides the sub-transmission symbols s1 and s2 to the partial SISO sphere decoder in early iterative decoding operations, and, divides the sub-transmission symbols having the a priori probability that is higher than the first reference value and the sub-transmission symbols having the a priori probability that is lower than the first reference value to update symbols forming s1 and s2, and performs the iterative decoding operation.

7. An iterative decoding receiving method of reducing complexity of a partial soft input soft output (SISO) sphere decoding operation in a channel encoding spatial multiple antenna system, the iterative decoding receiving method comprising:
 a) dividing symbols received from multiple antennas into a set $s_2$ of sub-transmission symbols that are estimated to have an a priori probability of a transmission symbol that is higher than a first reference value and a set $s_1$ of sub-transmission symbols that are estimated to have the a priori probability that is lower than the first reference value, based on a transmission symbol detection reliability estimated in a quasi-optimum detection method, wherein the quasi-optimum detection method is one of a zero forcing (ZF), or a minimum mean square error (MMSE) method;
 b) receiving the sub-transmission symbols $s_2$ estimated to have the higher a priori probability of the transmission symbol, and generating a soft value (extrinsic probability value) of the corresponding sub-transmission symbols;
 c) SISO sphere decoding the set of the sub-transmission symbols $s_1$ estimated to have the a priori probability of the divided transmission symbols, according to a partial maximum a posteriori (MAP) rule;
 d) receiving the calculated soft value of corresponding sub-transmission symbols, receiving the extrinsic probability of the reliability that is increased to higher than the first reference value by performing the SISO sphere decoding operation according to the partial MAP rule, and adding the soft value and the extrinsic probability;
 e) deinterleaving the added extrinsic probability to have an original bit order;
 f) SISO decoding a deinterleaved signal using a predetermined decoding algorithm;
 g) dividing sub-transmission symbols to be input to an SISO sphere decoder according to the partial MAP rule, based on an a priori probability of the SISO decoded and interleaved bit; and
 h) receiving the extrinsic probability of bits output by applying the SISO sphere decoding operation according to the partial MAP rule and the extrinsic probability of bits output without applying the SISO sphere decoding operation and performing an iterative decoding operation.

8. The iterative decoding receiving method of claim 7, wherein a) comprises:
 a1) receiving the symbols from the multiple antennas, and estimating the transmission symbols in a quasi-optimum detection method (the ZF or the MMSE method);
 a2) substituting available real number symbol values for a signal of the corresponding modulation method except real number symbol values estimated at a real equivalent dimension, calculating a Euclidian distance Cint to the received symbol, and changing the estimated transmission symbol to a real equivalent symbol;
 a3) initializing a counting variable i (i=1), and calculating a Euclidian distance Ci between the received symbol and the recombined transmission symbols that are estimated in an initial quasi-optimum detection operation;
 a4) comparing the Euclidian distance Cint to the Euclidian distance Ci between the received symbol and the recombined transmission symbols that are estimated in the initial quasi-optimum detection operation, and performing a counting operation at an i dimension when the Euclidian distance Cint is lower than the Euclidian distance Ci (Ci>Cint); and
 a5) adding the counting number at a real number dimension to the counting number at a complex number dimension, and dividing the sub-transmission symbol sets s1 and s2.

9. The iterative decoding receiving method of claim 8, wherein, in a5), the received symbols are estimated to be the sub-transmission symbol set s1 estimated to have the a priori probability that is lower than the first reference value when the counting number is greater than a predetermined second reference value.

10. The iterative decoding receiving method of claim 8, wherein, in a5), the received symbols are estimated to be the sub-transmission symbol set s2 estimated to have the a priori probability that is higher than the first reference value when the counting number is lower than the predetermined second reference value.

11. The iterative decoding receiving method of claim 7, wherein, in c), the reliability is increased by applying the partial SISO sphere decoding operation according to a cost function-based partial MAP rule after receiving the sub-transmission symbols that are estimated to have the a priori probability that is lower than the first reference value.

12. The iterative decoding receiving method of claim 7, wherein, in d), inputting the extrinsic probability generated by performing the partial SISO sphere decoding operation and the extrinsic probability of encoded bits of symbols not input to the partial SISO sphere decoder, to a channel decoder.

13. The iterative decoding receiving method of claim 7, wherein, in f), the decoding algorithm is one of a Bahl-Cocke-Jelinek-Raviv (BCJR) algorithm, a message passing algorithm (MPA), and a Viterbi algorithm.

14. The iterative decoding receiving method of claim 6, wherein, in g), the a priori probabilities of the encoded bits from the SISO decoder are divided, the sub-transmission symbols to be input to the partial SISO sphere decoder and the sub-transmission symbols not applied to an SISO sphere decoding algorithm are divided, and the iterative decoding operation is performed from c) to h).

15. The iterative decoding receiver of claim 1, wherein the quasi-optimum detection method includes a minimum mean square error (MMSE) method or a zero forcing (ZF) method.

* * * * *